W. J. PRUCHA.
DEVICE FOR MAKING STEREOSCOPIC PHOTOGRAPHS.
APPLICATION FILED JAN. 16, 1920.

1,371,438.

Patented Mar. 15, 1921.
2 SHEETS—SHEET 1.

Inventor.
William J. Prucha,
by Chas. J. O'Neill.
atty.

W. J. PRUCHA.
DEVICE FOR MAKING STEREOSCOPIC PHOTOGRAPHS.
APPLICATION FILED JAN. 16, 1920.
1,371,438.
Patented Mar. 15, 1921.
2 SHEETS—SHEET 2.
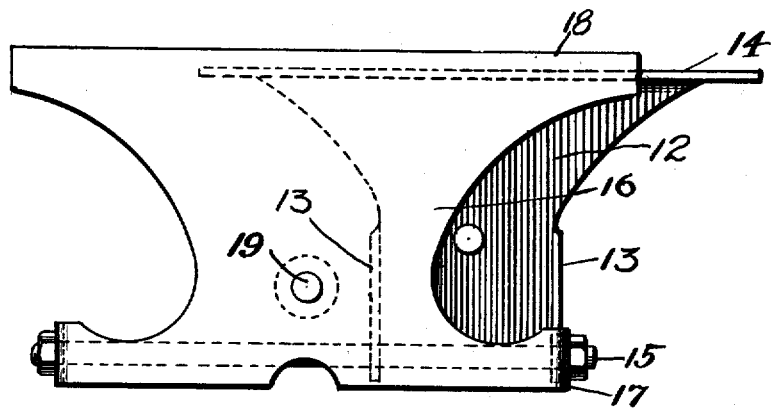
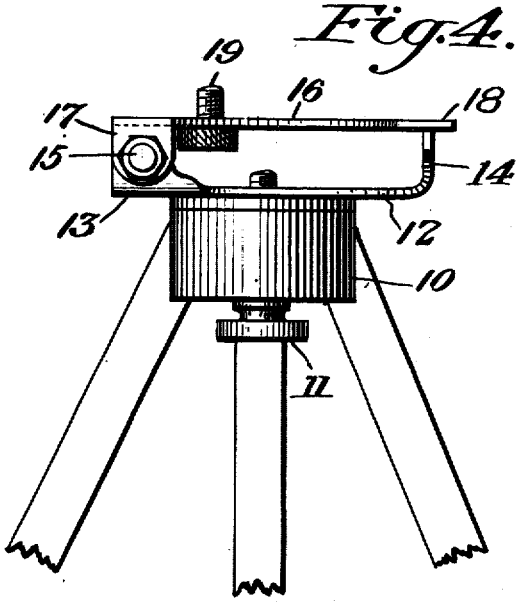

UNITED STATES PATENT OFFICE.

WILLIAM JAMES PRUCHA, OF SAN DIEGO, CALIFORNIA.

DEVICE FOR MAKING STEREOSCOPIC PHOTOGRAPHS.

1,371,438.  Specification of Letters Patent.  Patented Mar. 15, 1921.

Application filed January 16, 1920. Serial No. 351,876.

*To all whom it may concern:*

Be it known that I, WILLIAM JAMES PRUCHA, a citizen of the United States, residing at San Diego, California, in the county of San Diego, and whose post-office address is 1132 Eighth street, San Diego, California, have invented certain new and useful Improvements in Devices for Making Stereoscopic Photographs; and I do hereby declare the following to be a full, clear, and exact description of the invention, such as will enable others skilled in the art to which it appertains to make and use the same.

This invention relates to stereoscopic photography.

In the past, stereoscopic pictures have been made with cameras which have been built especially for the purpose, which necessitated not only expert knowledge of the use of the camera, but also of the manner of printing the pictures by the transposing of the films. It has, therefore, been difficult, if not impossible, for an amateur to successfully produce a stereoscopic picture, and furthermore, the cost of the stereoscopic camera has been more or less prohibitive, so far as the amateur photographer is concerned. It is the object of my invention to provide a device for producing stereoscopic pictures, which will not only enable the amateur to successfully produce such pictures, but which will also enable him to use the ordinary single lens camera and which will also enable him to print the pictures without transposing the films, that is to say, by the ordinary successive arrangement.

It is a further object of the invention to so construct the device that it may be attached to the ordinary tripod, and so that it will be relatively inexpensive.

In the drawing:

Fig. 3 is a top plan view with the platen in one of its extreme positions; and

Fig. 4 is an edge elevation.

Figure 1:
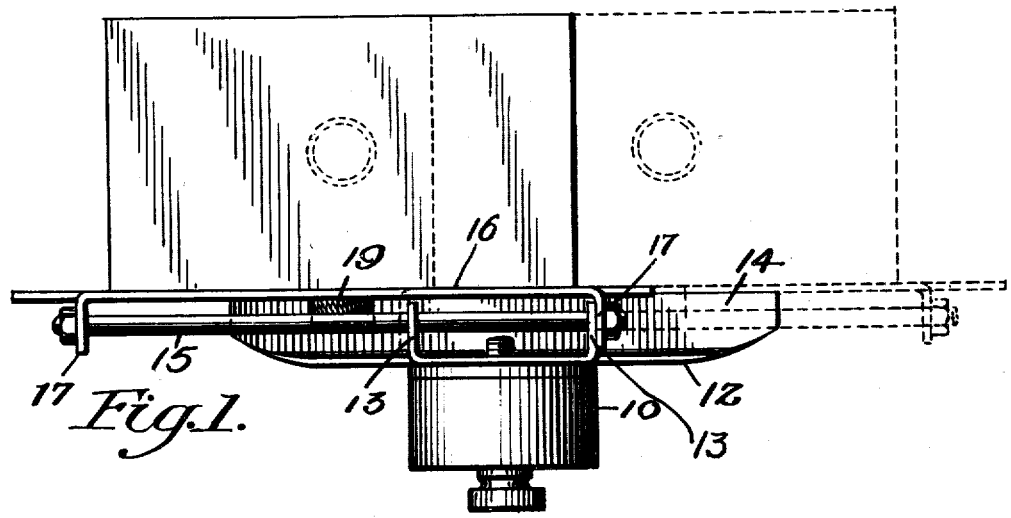
Figure 1 is a rear elevation of the device showing the two positions of the movable platen with a single lens camera mounted thereon, the latter being shown conventionally, however.
Figure 2:
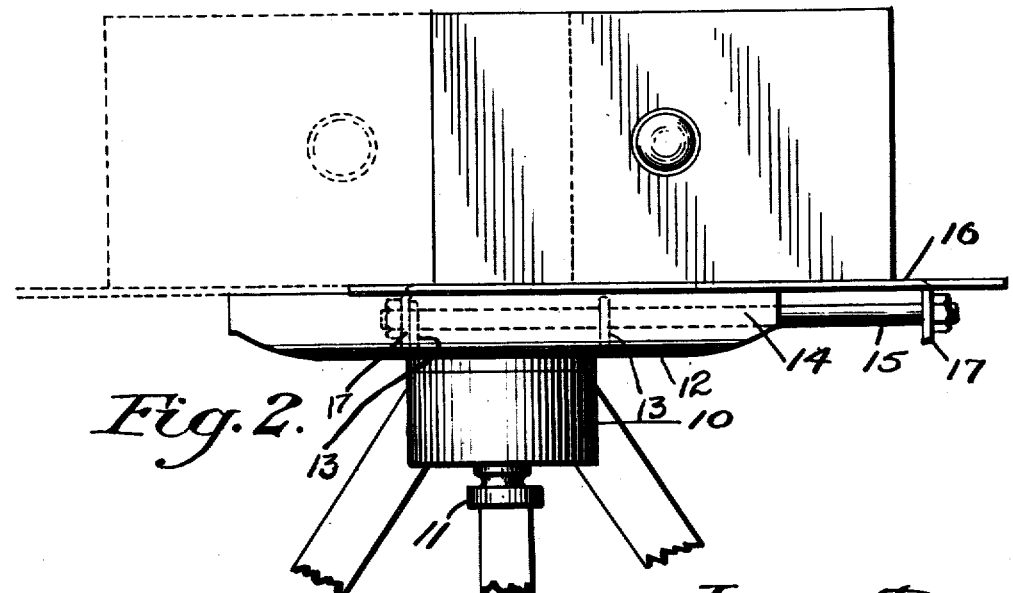
Fig. 2 is a front elevation thereof with the camera shown in both positions.

In the drawing I have illustrated the ordinary tripod 10 which is provided at the upper end with the usual screw 11 which is ordinarily used for the attachment of the camera to the tripod, but by which I attach my device to the tripod. My device comprises a stationary platen 12 which is provided on its inner face with means for receiving the screw 11. At one side of the stationary platen 12, a pair of ears 13 is upturned, which ears are in spaced relation, and at the other side of the platen, an upturned flange 14 which serves as a track, is located. A shaft 15 extends through the ears 13 and is both rotatable and slidable therein, the shaft being considerably longer than the distance between the ears, so that it may have extensive sliding movement in both directions. A second or movable platen 16 is provided with a pair of downwardly extending ears 17, through which the shaft 15 extends, and to which said shaft is rigidly secured, so that when the shaft is moved longitudinally or rotatably, the platen 16 will be likewise moved. This platen 16 is preferably flat and adapted to extend over the stationary platen 12, and has a portion 18 which rests upon the upper edge of the flange or track 14 and slides longitudinally thereon, the movable platen being supported in a substantially horizontal position. This movable platen is provided with a thumb screw or other suitable securing means 19 for the camera, so that the camera will rest upon the upper face of the movable platen and be supported in the proper position thereon.

In operation the stationary platen 12 may be secured to the tripod by means of the fastener 11 and movable platen 16 may be moved pivotally on the shaft 15 so as to permit easy access to the screw 19 for the attachment of the camera to the movable platen. After the camera is properly attached, the platen 16 is swung to such a position that the extended portion 18 thereof rests upon the track 14 so that the camera will be in proper relation to the object to be photographed. Before the film is exposed, the movable platen 16 is moved to one of its extreme positions, to the left, for instance, as shown in Fig. 1. In this position one of the ears 17 will abut against the adjacent ear 13 on the stationary platen, and the camera will thus be positively positioned. In this relation the film is exposed, and after the exposing of the first film, the platen 16 is shifted to its other extreme position where the opposite ear 17 abuts the adjacent stationary ear 13. In this extreme, or right hand position the second film is exposed. Thus, successive films are made from opposite sides of the objects. It will, of course, be realized that the shifting of the camera from one side of the object to the opposite side, enables the use of the ordinary single lens camera, so that the amateur may successfully make a stereoscopic picture without any more knowledge than is required in the making of an ordinary picture with a single lens camera. After the films are made they are printed in the succession in which they are made without the necessity of transposing. Or, on the other hand, the pictures may be printed directly from the negatives and used in the ordinary stereoscope.

What I claim is:

1. In a device of the class described, a stationary platen, a platen mounted thereon for pivotal and sliding movements, and a single lens camera supported by the movable platen.

2. In a device of the class described, a stationary platen, a platen mounted thereon for pivotal and sliding movements, said stationary platen provided at its rear with an upstanding flange for slidably supporting the rear of said movable platen, the forward ends of each platen being connected together for pivotal and sliding movements and a single lens camera supported by the movable platen.

3. A device of the class described, a stationary platen, a platen mounted thereon for pivotal and sliding movements, said stationary platen provided at its rear with an upstanding flange and at its front portion with a pair of bent up ears, the rear of said movable platen resting on and having sliding engagement with the upstanding rear flange of the stationary platen, the front portion of said movable platen provided with downwardly extending ears overhanging said ears of the movable platen and a pivot member passing through all of said ears, the ears of the movable platen being spaced much wider apart than the ears of the stationary platen to allow for sufficient sliding movement of the movable platen.

In testimony whereof I affix my signature.

WILLIAM JAMES PRUCHA.